United States Patent [19]
Haddad et al.

[11] 3,987,016

[45] Oct. 19, 1976

[54] METHOD FOR THE PREPARATION OF POLYARYLENE SULFIDES CONTAINING PENDANT CYANO GROUPS BY POLYMERIZING M-BENZENEDITHIOL, DIBROMOBENZENE, AND 2,4-DICHLOROBENZONITRILE

[75] Inventors: Ibrahim E. Haddad, Amman, Jordan; Shaun A. Hurley, Rickmansworth, England; Carl S. Marvel, Tucson, Ariz.

[73] Assignee: The United States of America as represented by the Secretary of the Air Force, Washington, D.C.

[22] Filed: Jan. 16, 1975

[21] Appl. No.: 541,489

[52] U.S. Cl. ............................ 260/79.1; 260/47 R; 260/61
[51] Int. Cl.² ............................................ C08G 75/14
[58] Field of Search ................ 260/47 R, 61, 79.1

[56] References Cited
UNITED STATES PATENTS

| | | |
|---|---|---|
| 3,432,468 | 3/1969 | Gabler ............................ 260/47 R |
| 3,706,702 | 12/1972 | Studinka et al. ...................... 260/61 |
| 3,882,092 | 5/1975 | Moberly ............................ 260/79.1 |
| 3,919,177 | 11/1975 | Campbell ........................... 260/79.1 |

*Primary Examiner*—Joseph L. Schofer
*Assistant Examiner*—Peter F. Kulkosky
*Attorney, Agent, or Firm*—Joseph E. Rusz; William J. O'Brien

[57] ABSTRACT

Polyphenylene sulfides are synthesized by refluxing a mixture of an aromatic sulfide and an aromatic dibromide such as m-benzenedithiol and m-dibromobenzene in a basic medium of potassium carbonate in dimethylformamide or dimethylacetamide. The products obtained are slightly off-white with relatively low melting ranges and have inherent viscosities in the 0.2 to 0.4 dl/g range in hexamethylphosphoric triamide. Similar polyphenylene sulfides containing pendant cyano groups along the polymer chains were obtained using 5 mole-% of either 2,4-dichlorobenzonitrile or 3,5-dichlorobenzonitrile as a reaction constituent. The products were similar to the pure polyphenylene sulfides except that they showed lower melting ranges and gave insoluble products when heated alone or in the presence of zinc chloride.

2 Claims, No Drawings

METHOD FOR THE PREPARATION OF POLYARYLENE SULFIDES CONTAINING PENDANT CYANO GROUPS BY POLYMERIZING M-BENZENEDITHIOL, DIBROMOBENZENE, AND 2,4-DICHLOROBENZONITRILE

STATEMENT OF GOVERNMENT INTEREST

The invention described herein may be manufactured and used by or for the Government for governmental purposes without the payment of any royalty thereon.

BACKGROUND OF THE INVENTION

This invention relates to a method for preparing polyarylene sulfides. More particularly, this invention concerns itself with a method for synthesizing polyphenylene sulfides and related polymers for use as thermally stable laminatng resins.

Although many thermally stable polymers can be fabricated into fibers and films, the use of these materials as resins in laminating, molding or coating applications, often poses considerable processing and handling problems. Besides the required stability towards oxidative and hydrolytic degradation, polymers which are to be used as laminating resins must be low melting or soluble in inert solvents in order to wet the surface of the coated or reinforced material and should show good adhesive properties. If the final polymeric resin is a crosslinked material, the crosslinking process should not be accompanied by the evolution of any gaseous or other volatile products as these would cause voids that result in weak points in the final laminate or coating.

In an attempt to overcome the problems associated with the use of film forming resins, it was suggested that polyarylene sulfides be utilized for laminating applications. Polyphenylene sulfides and their related polymers are well known and have been previously reported in the literature. These polymers, however, did not possess either the solubility or the low melting ranges required for a laminating resin and thus the need for a polyphenylene sulfide with the proper properties became obvious. After considerable effort, a method has been evolved that provides the means for synthesizing polyarylene sulfides that possess the characteristics needed to make them useful as molding, coating and laminating resins. These resins are obtained in the precuring stage as polyarylene sulfides with and without substituted cyano groups along the polymer chains, and having softening ranges around 100° C. The resins are cured by heating at temperatures between 350° and 400° C or by heating up to 290° C under nitrogen in the presence of zinc chloride. It is theorized that the crosslinking might proceed by the trimerization of the nitrile groups without the formation of any volatile sideproducts. The products were determined to be crosslinked on the basis of their insolubility in hexamethylphosphoric triamide in which the non-crosslinked polymers were quite soluble and from infrared spectra that were similar to those obtained for the non-cured polymers without the nitrile absorption.

SUMMARY OF THE INVENTION

In the present invention, polyphenylene sulfides and related polymers can be synthesized from a reaction medium composed of m-benzenedithiol and an aromatic dibromide. The reaction was carried out under reflux conditions in a basic medium of potassium carbonate in dimethylformamide or dimethylacetamide. The products obtained were slightly off-white with relatively low melting ranges and had inherent viscosities in the 0.2 to 0.4 dl/g range in hexamethylphosphoric triamide. In another embodiment of the invention, similar polyphenylene sulfides containing pendant cyano groups along the polymer chains were obtained by the use of 5 molar percent of either 2,4-dichlorobenzonitrile or 3,5-dichlorobenzonitrile. The products were similar to the pure polyphenylene sulfides except that they showed lower melting ranges and gave insoluble products when heated alone or in the presence of zinc chloride.

Accordingly, the primary object of this invention is to provide a novel method for producing polyphenylene sulfides and related polymers.

Another object of this invention is to provide a novel method for producing polyphenylene sulfides containing pendant cyano groups along the polymer chain.

Still another object of this invention is to provide a method for producing polyphenylene sulfide resins that can be used in coating and molding applications.

A further object of this invention is to provide a method for preparing polyphenylene sulfides and related polymers for use as thermally stable laminating resins.

The above and still further objects, advantages and features of this invention will become more readily apparent upon consideration of the following detailed description of its preferred embodiments.

DESCRIPTION OF THE PREFERRED EMBODIMENTS

In accordance with this invention, it has been found that the above described objects can be accomplished by effecting a reflux reaction between an aromatic sulfide selected from the group consisting of m-benzenedithiol, p-bromothiophenol and 4,4'-biphenyletherdithiol; and an aromatic dibromide selected from the group consisting of m-dibromobenzene, p-dibromobenzene, 4,4'-dibromobiphenyl, 1,4-dibromonaphthalene, and bis (p-bromophenyl) ether. The reaction takes place in a basic medium of potassium carbonate in dimethylformamide or dimethylacetamide. Polyphenyl sulfides having a pendant cyano group along the polymer chain can also be prepared in a similar type reflux reaction by using 5 molar percent of either 2,4-dichlorobenzonitrile or 3,5-dichlorobenzonitrile. These polymers are similar to the polyphenylene sulfide polymers referred to above except they exhibit lower melting point ranges and give insoluble products when heated above 350° or in the presence of zinc chloride.

Polyphenylene sulfides with various structures were prepared in a potassium carbonate/dimethylformamide medium. Some of their properties were determined, in order to ascertain the most suitable backbone for the polyphenylene sulfide which was eventually to be substituted with nitrile groups and crosslinked to give a thermally stable resinous polymer suitable for laminating applications.

The composition of the various polymeriztions are given in Table I. Elemental analysis data of the various polymers are given in Table II.

TABLE I[b]

| Polymer No. | Chemical Formula of Polymer | MBDT[a] g(mole) | Dibromo Cmpd[a] g(mole) | DMF (ml) | K₂CO₃ g(mole) | Time (hr) | Yield (g) | mp[c] (°C) | $n_{inh}$[d] (dl/g) |
|---|---|---|---|---|---|---|---|---|---|
| P I: | [—(C₆H₄)—S—(C₆H₄)—S—]ₙ[g] (meta-meta) | 5.6077 (0.04) | mDBB 9.4341 (0.04) | 80 | 12.70 (0.092) | 24 | 8.7 | 110–120 | 0.1 |
| P II: | [—(C₆H₄)—S—(C₆H₄)—S—]ₙ (meta-para) | 5.6060 (0.04) | pDBB 9.4290 (0.04) | 80 | 12.70 (0.092) | 24 | 7.7 | 110–140 | 0.15 |
| P III: | Br—(C₆H₄)—S—H | 4.725[e] (0.025) |  | 50 | 3.97 (0.029) | 24 | 2.5 | 240–250 | — |
| P IV: | [—(C₆H₄)—(C₆H₄)—S—(C₆H₄)—S—]ₙ | 4.114 (0.031) | DBBP 9.6721 (0.031) | 70 | 9.84 (0.071) | 24 | 8.81 | 160–190 | — |
| P V: | [—(C₆H₄)—S—(C₆H₄)—S—(C₆H₄)—(C₆H₄)—S—(C₆H₄)—S—]ₙ | 2.8410 (0.02) | mDBB, 2.3633 (0.01) DBBP, 3.1200 (0.01) | 40 | 6.35 (0.046) | 24 | 4.25 | 85–105 | 0.11 |
| P VI: | [—(C₆H₄)—S—(naphthalene)—S—]ₙ | 2.8392 (0.02) | DBN (5.7199 (0.02) | 40 | 6.35 (0.046) | 24 | 4.67 | 155–195 | — |
| P VII: | [—S—(C₆H₄)—S—(C₆H₄)—O—(C₆H₄)—]ₙ | 2.8442 (0.02) | DBE 6.5698 (0.02) | 40 | 6.35 (0.046) | 96 | 4.41 | 55–70 | 0.07 |
| P VIII: | [—(C₆H₄)—S—(C₆H₄)—O—(C₆H₄)—S—]ₙ (meta) | 2.3423[f] (0.01) | mDBB 2.3618 (0.01) | 20 | 3.2 (0.023) | 48 | 3.20 | 70–90 | 0.14 |
| P IX: | [—(C₆H₄)—S—(C₆H₄)—O—(C₆H₄)—S—]ₙ (para) | 2.3400[f] (0.01) | pDBB 2.3600 (0.01) | 20 | 3.2 (0.023) | 48 | 2.96 | 185–235 | 0.22 |

[a] MBDT = m-benzenedithiol; mDBB = m-dibromobenzene; pDBB = p-dibromobenzene; DBBP = 4,4′-dibromobiphenyl; DBN = 1,4-dibromonaphthalene. DBE = bis (p-bromophenyl) ether
[b] All polymerizations were run at 150–155° C
[c] The melting ranges reported were run in open capillaries and were uncorrected.
[d] Viscosities were obtained at 30° C using 0.5 % solution of the polymer in HMPA
[e] p-Bromothiophenol
[f] 4,4′-Biphenyletherdithiol
[g] The letter n represents a positive integer

TABLE II

| Polymer No. | Repeating Unit | Calculated (C) Found (F) | % C | % H | % S | % Br |
|---|---|---|---|---|---|---|
| P I | $C_6H_4S$ | C | 66.67 | 3.70 | 29.63 | — |
|  |  | F | 63.42 | 3.54 | 27.28 | 5.51 |
| P II | $C_6H_4S$ | C | 66.67 | 3.70 | 29.63 | — |
|  |  | F | 66.21 | 3.73 | 28.45 | 1.75 |
| P III | $C_6H_4S$ | C | 66.67 | 3.70 | 29.63 | — |
|  |  | F | 63.88 | 3.56 | 26.91 | 5.24 |
| P IV | $C_{18}H_{12}OS_2$ | C | 73.97 | 4.11 | 21.92 | — |
|  |  | F | 70.85 | 4.12 | 19.98 | 5.00 |
| P V | $C_{30}H_{18}OS_4$ | C | 70.78 | 3.94 | 25.20 | — |
|  |  | F | 69.13 | 3.92 | 24.16 | 2.28 |
| P VI | $C_{16}H_{10}S_2$ | C | 72.18 | 3.76 | 24.06 | — |
|  |  | F | 71.95 | 3.80 | 23.85 | <0.3 |
| P VII | $C_{18}H_{12}OS_2$ | C | 70.13 | 3.90 | 20.78 | — |
|  |  | F | 64.66 | 3.85 | 18.65 | 8.10 |
| P VIII | $C_{18}H_{12}OS_2$ | C | 70.13 | 3.90 | 20.78 | — |
|  |  | F | 67.56 | 3.84 | 20.18 | <0.3 |
| P IX | $C_{18}H_{12}OS_2$ | C | 70.13 | 3.90 | 20.78 | — |

TABLE II-continued

| Polymer No. | Repeating Unit | Calculated (C) Found (F) | Analysis % C | % H | % S | % Br |
|---|---|---|---|---|---|---|
| | | F | 67.06 | 4.34 | 18.84 | — |

The compounds disclosed in Table I exhibited a bright yellow color during the initial stages of the reaction which slowly changed to a light brownish color as the reaction proceeded. At the end of the reaction, the reaction mixture was cooled and the polymers were obtained by precipitation using an acidic water-methanol solution. With the exception of polymers PVII, PVIII and PIX all the polymers obtained were stirred in a large volume of ether to dissolve the low molecular weight fractions and possibly any unreacted starting materials. Polymer PVII was precipitated from benzene and polymers PVIII and PIX were extracted with boiling ethanol during the final purification stages.

As indicated in Table I, the polymers were generally obtained in fairly high yields.

The structures of the polymers obtained were confirmed by elemental analysis (Table II) and by infrared spectroscopy. The polymerizations are believed to proceed via the nucleophile displacement mechanism and no positional isomerism on the aromatic ring was expected. As also would be expected, the melting ranges of the polyphenylene sulfides and related polymers (Table I) are dependent upon their respective structures. Polymers PIII and PIX have the most regular structures and were found to possess the highest melting ranges. This phenomenon was most visible from results obtained from polymer PIV and PV which were obtained from a mixture of two different dibromo compounds.

These results reveal that the incorporation of further m-thiophenylene units along the polymer chains has a rather large effect on the physical characteristics of the polymer and that a control over the melting range can be achieved by varying the amounts of the various dibromo compounds used.

The softening behavior of polymers PI, PII and PIII have been studied. These polymers exhibit distinct melting points and display a two-stage penetration on the softening apparatus. Generally, these penetrations occurred close to or at somewhat lower temperatures than the melting ranges reported in Table I. In the case of polymer PI, DTA showed two distinct endotherms at 85°–90° C and at 120° C which are apparently two crystalline melting points. It is suggested, therefore, that two different crystalline forms are present. The same behavior was observed with poly)p-thio-phenylene) samples obtained from commercial sources.

Isothermal aging of some of the polymers were run in a small furnace in an atmosphere of non-circulating air and the samples were aged at temperatures of 200°, 300°, 350° and 400° C. The results of these tests are shown in Table III. All the polymers except PIII melted and darkened at 200° C. This behavior was exhibited by PIII at 300° C. At the completion of the isothermal aging the polymers turned into black solids that could not be separated from the walls of the glass containers, which indicates the good adhesion properties of these polymers even after heating at 400° C.

The solubility of the polymers varied considerably with structure. In general, the polymers did not dissolve in cold organic solvents but some of them did dissolve when heated but precipitated out when the solution was cooled. All polymers were, however, very slowly solubilized in cold hexamethylphosphoric triamide and solutions used in viscosity measurements were prepared by initially dissolving the polymer in the hot solvent and allowing the solution to cool to room temperature.

TABLE III

Isothermal Aging of Polyphenylene Sulfides and Related Polymers
Weight Loss, %

| Polymer | 6 days at 200° C | 8 days at 300° C | 7 days at 350° C | 9 days at 400° C |
|---|---|---|---|---|
| P I | 0.34 | 4.5 | 21.8 | 67.8 |
| P II | 0.41 | 1.95 | 7.07 | 77.0 |
| P III | 6.65 | 13.3 | 16.0 | 84.4 |
| P IV | 1.48 | 4.96 | 8.8 | 49.3 |
| P V | 1.53 | 3.08 | 9.6 | 66.0 |
| P VI | 1.56 | 2.32 | 17.2[a] | — |

[a]This was run only 5 days.

From a consideration of the polymerization reactions of this invention, it was decided that the backbone of poly(m,p-thio-phenylene) would be the most suitable one to use in a further embodiment of the invention involving the preparation of polyphenylene sulfides containing nitrile groups. This choice was based on the availability of starting materials and the better solubility and low melting range of this polymer. The results of tests run to determine the reaction conditions under which the poly(m,p-thiophenylene) of highest molecular weight could be obtained are given in Table IV. Elemental analysis data obtained for these polymers are shown in Table V.

Three approaches to try to raise the molecular weight of poly(m,p-thiophenylene) were used. The first involved the use of a larger volume of solvent (DMF), the second involved the use of a longer reaction time, and the third involved the use of a different solvent along with potassium carbonate.

During polymerizations 1, 2, 3 and 4, the polymers were observed to precipitate from the reaction media and to coagulate. Since the premature precipitation was believed to result in lower molecular weight polymers, reactions 5 and 6 were carried out using more dilute solutions. Less precipitation and no coagulation occurred during these runs, however, the products obtained exhibited lower viscosities and thus lower molecular weights.

TABLE IV

Effect of Polymerization Conditions on the Molecular Weight of Poly (m,p - thiophenylene)

| Polymerization | MBDT[a](g) | pDBB[a](g) | Solvent (ml) | $K_2CO_3$ (g) | Temp (°C) | Time (hr) | Mp[b] (°C) | $\eta_{inh}$[c] (dl/g) |
|---|---|---|---|---|---|---|---|---|
| 1 | 5.6060 | 9.4290 | DMF 80 | 12.70 | 150–155 | 24 | 110–140 | 0.15 |
| 2 | 2.8434 | 4.7197 | DMF 40 | 6.35 | 150–155 | 48 | 110–130 | 0.26 |
| 3 | 2.8416 | 4.7230 | DMF 40 | 6.35 | 150–155 | 72 | 105–125 | 0.40 |
| 4 | 2.8435 | 4.7271 | DMF 40 | 6.35 | 150–155 | 96 | 100–125 | 0.24 |
| 5 | 2.8425 | 4.7249 | DMF 80 | 6.35 | 150–155 | 48 | 110–125 | 0.13 |
| 6 | 2.8452 | 4.7294 | DMF 80 | 6.35 | 150–155 | 72 | 100–120 | 0.15 |
| 7 | 2.8401 | 4.7201 | DMAc 40 | 6.35 | 165–170 | 48 | 100–120 | 0.41 |
| 8 | 2.8540 | 4.7302 | DMAc 40 | 6.35 | 165–170 | 72 | 105–140 | 0.33 |
| 9 | 2.8529 | 4.7278 | HMP[a] 40 | 6.35 | 190–195 | 72 | 110–130 | 0.28 |
| 10 | 2.8411 | 4.7224 | NMeP[a] 40 | 6.35 | 170–175 | 48 | 120–135 | 0.26 |
| 11 | 2.8471 | 4.7318 | Sn[a] 40 | 6.35 | 170–175 | 48 | 85–90 | 0.12 |

[a]MBDT — m-Benzenedithiol; pDBB = p-dibromobenzene; HMP = hexamethylphosphoric triamide; NMeP = N-methylpyrrolidone; Sn = sulfolane.
[b]The melting ranges reported were run in capillaries and are uncorrected.
[c]Viscosities were obtained at 30° C using 0.5 % solution of the polymer in hexamethylphosphoric triamide.

TABLE V

Elemental Analysis of Poly (m,p-thiophenylene) Samples.[a]

| Poly- merization | Analytical Data Found | | | |
|---|---|---|---|---|
| | % C | % H | % S | % Br |
| 1 | 66.21 | 3.73 | 28.45 | 1.75 |
| 2 | 65.89 | 3.63 | 29.12 | <0.3 |
| 3 | 67.32 | 3.75 | 29.35 | 0.93 |
| 4 | 66.10 | 3.75 | 29.85 | <0.3 |
| 5 | 66.02 | 3.72 | 29.70 | <0.3 |
| 6 | 66.09 | 3.66 | 29.58 | <0.3 |
| 7 | 65.92 | 3.74 | 29.87 | — |
| 8 | 65.64 | 3.63 | 29.93 | — |
| 9 | 65.67 | 3.72 | 28.00 | — |
| 10 | 66.11 | 3.62 | 29.38 | — |
| 11 | 62.45 | 3.92 | 28.64 | — |

[a]Anal. calculated for $(C_6H_4S)_n$: C, 766.67 %; H, 3.70 %; S, 29.63 %.

As indicated in Table IV, an increase in molecular weight was obtained when the reaction time was raised from 24 to 72 hours. When the reaction time was raised to 96 hours, a drop in the molecular weight was observed. No plausible explanation could be given for this unexpected behavior.

Dimethylacetamide, hexamethylphosphoric triamide, pyridine, N-methylpyrrolidone, sulfolane, quinoline and diphenyl ether were used in the polymerization reactions replacing dimethylformamide as the solvent. No polymerization occurred when diphenyl ether and pyridine were used and only dimethylacetamide was found to be more effective as it gave results that were slightly better than those obtained in dimethylformamide. For that reason dimethylacetamide was used in the embodiment of this invention which involves the preparation of polyphenylene sulfides containing pendant cyano groups.

After the selection of poly(m,p-thiophenylene) as the polymer whose backbone was to be used in the preparation of the nitrile-containing polyphenylene sulfides, tests were run to determine the best method by which such nitrile groups can be introduced into the polymer system. Three different methods to introduce the nitrile groups were attempted. The first involved end-capping the polymer chains with nitrile groups while the two other methods involved substituting the nitrile groups along the polymer chains.

A poly (m,p-thiophenylene) presumably containing only nitrile end-groups was prepared by the reaction of the initial poly(m,p-thiophenylene) with excess m-benzenedithiol in $K_2CO_3$/DMF followed by the reaction of the newly formed polymer with 4-bromobenzonitrile. That a polymer containing nitrile groups was obtained, was shown by elemental analysis and infrared spectroscopy which indicated the presence of nitrile groups after the polymer was vigorously stirred in a large volume of ether to remove 4-bromobenzonitrile. However, elemental analysis also indicated the presence of bromine which showed that the end-capping was incomplete.

Two techniques were used to introduce nitrile groups along the polymer backbone. The first involved the bromination of the initial poly(m,p-thiophenylene) with bromine followed by treating the brominated polymer (m.p. 205°–225° C) with cuprous cyanide. The final product showed a distinct nitrile absorption in the infrared spectrum, however, elemental analysis showed that a substantial amount of bromine was still left. This polymer was bright yellow, did not dissolve in all solvents tested and turned dark brown when heated around 200° C but did not melt when heated up to 500° C. It could not be determined whether the insolubility of the polymer and its inability to melt is an inherent property of the polymer or whether it is due to cross-linking that might have occurred during its preparation.

The second technique to introduce nitrile groups along the polymer chains involved the use of a small molar percent of a nitrile containing comonomer. In this method, a polyphenylene sulfide containing pendant cyano groups was prepared from m-benzenedithiol, 95 molar percent dibromobenzene and 5 molar percent 2,4-dichlorobenzonitrile or 3,5-dichlorobenzonitrile. The polymers were prepared in dimethylacetamide and potassium carbonate since in this medium the highest molecular weight poly(m,p-thiophenylene) was obtained (Table IV). The polymers were stirred in ether in the final purification stages and were found to lose between 15–20% of their weight believed to be low molecular weight fractions. The polymers melted at ranges about 20° C lower than the corresponding pure poly(m,p-thiophenylene) of comparable inherent viscosity. The structures of the polymers were determined by infrared spectroscopy which showed a nitrile absorption at 2245 cm⁻ and from elemental analysis which gave results that were within the allowed limits of the theoretical values. The reaction which is believed to take place during the synthesis of the nitrile containing polyphenylene sulfides is illustrated by the following two schematic representations indicated as being (A) and (B).

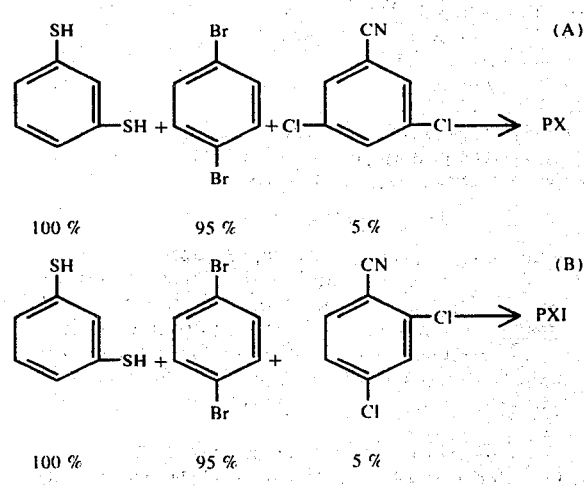

Isothermal aging of the polymers was carried in a small furnace in air and the results of this test are shown in Table VI. The results of isothermal aging and TGA seem to indicate that these polymers possess good thermal stability.

Crosslinking of these polymers (PX and PXI) was carried out under nitrogen at 350°–400° C without the presence of a catalyst or at 290° C in the presence of zinc chloride. Initial attempts to cure PX in a carver press at 250°–300° C and 15,000 psi resulted in a soluble polymer, however further attempts to cure the same polymer at temperatures in excess of 350° C and under nitrogen resulted in a completely insoluble product. A fiber cloth was then impregnated with about 34 percent of its weight of nitrile-containing poly(m,p-thiophenylene) and the soft laminate obtained, when heated in a carver press at 350°–400° C with occasional application of about 10,000 psi, produced a black, hard but slightly flexible laminate without any appreciable weight loss.

Crosslinking of polymers PX and PXI with zinc chloride was carried out since the curing process in this case can be achieved at lower temperatures (290°–300° C). Because zinc chloride is too hygroscopic, a definite percent by weight of this catalyst could not be determined exactly, however, about 7 percent by weight was used. Initial heating of PX at 210° C and under nitrogen failed to produce any crosslinking of the polymer chains and yielded a product that was soluble in hexamethylphosphoric triamide in which the original linear polymer dissolved quite readily. Further heating of the polymer at 290° C for 24 hours produced an 89 percent insoluble polymer, PXII. Trimerization of polymers PX and PXI was then carried out by heating in the presence of zinc chloride and under nitrogen at 210° C for 12 hours followed by heating at 290° C for 24 hours.

The product obtained by heating PX was 87 percent insoluble and that obtained from PXI (PXIII) was 76 percent insoluble. These results seem to indicate that PXI is probably more difficult to crosslink than PX and it is believed that this could be due to the presence of the nitrile groups in the more crowded ortho positions. Identification of the products as the result of trimerization and not charring was indicated by the infrared spectrum of the final products which were identical to those obtained for the starting materials without the nitrile absorption and by elemental analysis which gave values very close to the expected ones. Further evidence for the crosslinking was supplied by the Ehlers-Fisch softening behavior technique in which a comparison of the amount of penetration under load and at different temperatures was made between the linear and crosslinked polymers.

The crosslinked products were dark brown, almost black, and showed excellent glass adhesion which made it difficult to obtain crosslinked polymers free of glass particles for use in the various tests. A convenient method to obtain the polymer free of glass particles involved the coating of the inner walls of the glass tube with aluminum foil followed by the removal of the foil from the crosslinked product by reaction with dilute hydrochloric acid.

The results of isothermal aging of the untreated crosslinked polymers (PXII and PXIII) as well as those washed with hexamethylphosphoric triamide and water to remove zinc chloride are shown in Table VI. These results show that the crosslinked polymers possess a rather high thermal stability. A comparison of these results with those obtained for the linear polymers show that zinc chloride-free crosslinked polymers possessed the highest thermal stability while the untreated crosslinked polymers possessed the lowest thermal stability. These results seem to indicate that zinc chloride could be the reason behind the excessive weight loss in that it might be enhancing the oxidation and hence degradation of the polymer.

A laminate was prepared from PX on glass fiber in the presence of zinc chloride. The curing was run at 250° C under about 15,000 psi and produced a hard but slightly flexible laminate.

In order to further illustrate to those skilled in the art, the best mode of operation for the present invention, there are presented the following detailed examples. Since all of the polymerization reactions were carried out in a similar manner, only representative examples are presented and they should not be considered as limiting the scope of the invention in any way.

EXAMPLE 1

Into a 200-ml, three-necked flask equipped with a mechanical stirrer, a reflux condenser and a nitrogen bubbler were placed 2.8401 g (0.02 mole) of m-benzenedithiol, 4.7201 g (0.02 mole) of p-dibromobenzene, 6.35 g (0.046 mole) of potassium carbonate and 40 ml of dimethylacetamide. The reaction mixture which turned light yellow was stirred and the temperature of the oil bath was raised to 160° C and maintained between 160° and 170° C for 48 hrs. After cooling to room temperature, the reaction mixture was poured with stirring into a cold solution of 800 ml of methanol, 400 ml of water and 100 ml of conc. hydrochloric acid and the solid that formed was filtered and washed well with water and methanol. The dry solid was then stirred well in 1.5 liter of ether, filtered and dried in vacuo.

The off-white solid obtained weighed 3.7 g (89 percent yield) and softened at 100°–120° C. A 5 percent solution of the polymer in hexamethylphosphoric triamide gave an inherent viscosity of 0.41 dl/g.

EXAMPLE 2

The preparations of the polymers containing pendant cyano groups were carried out in the same manner as Example 1. Polymer PX was prepared from 2.8457 g (0.02 mole) of m-benzenedithiol, 4.4827 g (0.0190 mole) of p-dibromobenzene, 0.1722 g (0.0010 mole) of 2,4-dichlorobenzonitrile and 6.35 g (0.046 mole) of potassium carbonate in 40 ml of dimethylacetamide and was obtained in 84 percent yield after stirring in ether.

Anal. Calc'd for $(C_{12}H_8S_2)_{0.95n}$ $(C_{13}H_7NS_2)_{0.05n}$; C,66.52%; H,3.68%; S,29.49% N,0.27%; Found: C,66.33%; H,3.80%; S,29.43% N,0.25%

EXAMPLE 3

Polymer PXI was prepared in the same manner as Example 2 from 2.8447 g (0.020 mole) of m-benzenedithiol, 4.4831 g (0.0190 mole) of p-dibromobenzene, 0.1725 g (0.0010 mole) of 3,5-dichlorobenzonitrile and 6.35 g (0.046 mole) of potassium carbonate in 40 ml of dimethylacetamide and was obtained in 82 percent yield after stirring in ether.

Anal. Calc'd for $(C_{12}H_8S_2)_{0.95n}(C_{13}H_7NS_2)_{0.05n}$: C,66.52%; H,3.68%; S,29.49% N,0.27% Found: C,66.33%; H,3.80%; S,29.43% N,0.25%

The cross-linking of the polymers from Examples 2 and 3 are more specifically illustrated in Example 4 and 5 as follows.

EXAMPLE 4

A 0.5 g sample of polymer PX was mixed well with 0.035 g of zinc chloride by the use of a mortar and pestle. The resulting mixture was then added to a test tube with a side-outlet and equipped with a nitrogen inlet. Under nitrogen, the contents of the tube were heated at 210° C for 12 hr followed by raising the temperature to 290° C and maintaining it at this temperature for 24 hr. The black solid obtained (PXII) was found to be 89 percent insoluble when stirred in hexamethylphosphoric triamide for 24 hr and gave an infrared spectrum that corresponded to that obtained for polymer PX without the cyano absorption.

Anal. Calc'd for PXII: C,66.52%; H,3.68%; N,0.27%; S,29,49%; Found: C 65.72%; H,3.53%; N,0.34%; S,29.17%

TABLE VI

Isotherman Aging of the Nitrile-Containing and Crosslinked Polymers

| Polymer[a] | Cumulative Weight Loss, % | |
|---|---|---|
| | 10 days at 300° C | 8 days at 350° C |
| PX | 3.7 | 16.2 |
| PXI | 3.9 | 18.6 |

TABLE VI-continued

Isotherman Aging of the Nitrile-Containing and Crosslinked Polymers

| Polymer[a] | Cumulative Weight Loss, % | |
|---|---|---|
| | 10 days at 300° C | 8 days at 350° C |
| PXII | 2.4 | 19.8 |
| PXIIa | 2.3 | 13.2 |
| PXIIIa | 1.5 | 15.8 |

[a]POLYMERS PXIIa, PXIIIa WERE CROSSLINKED POLYMERS WASHED TO REMOVE ZINC CHLORIDE.

EXAMPLE 5

The crosslinking of polymer PXI was carried similarly as that of polymer PX in Example 4. The resulting crosslinked product, PXVI, was only 76 percent insoluble in hexamethylphosphoric triamide.

Anal. calc'd for PXIII: C,66.52%; H,3.68%; N,0.27%; S,29.49%; Found: C,66.34%; H,3.63%; N,0.22%; S,29.47%

The utilization of the polymeric materials of this invention for laminating applications is illustrated more specifically in Example 6 as follows.

EXAMPLE 6

Laminates were prepared by impregnating 3 pieces of E glass 181 glass fiber cloth with a solution of the polymer with or without zinc chloride in hexamethylphosphoric triamide followed by evaporation of the solvent under partial vacuum. The soft laminates thus obtained were placed in a carver press and heated under pressure for 24 hr to give dark colored hard laminates.

From a consideration of the foregoing, it can be seen that the present invention provides a simple, economical and efficient method for preparing thermally stable polyphenylene sulfides and related polymers. These polymers find utility in molding and coating applications and especially as thermally stable laminating resins.

While the invention has been described with particularity in reference to specific embodiments thereof, it is to be understood that the disclosure of the present invention is for the purpose of illustration only and is not intended to limit the invention, the scope of which is defined by the appended claims.

What is claimed is:

1. A method for synthesizing polyphenylene sulfides containing pendant cyano groups along the polymer chain which comprises the steps of (1) heating in a temperature range 160°–170° C at reflux for 48 hours m-benzenedithiol; dibromobenzene; 2,4-dichlorobenzonitrile in about 1:1:0.05 molar ratio in a solvent mixture of about 40 ml of dimethyl acetamide and 0.05 mol of potassium carbonate (2) pouring the reaction mixture into a cold solution of methanol, water and concentrated hydrochloric acid (3) filtering and washing the product of step (2) in water, followed by stirring in ether and vacuum drying.

2. A polymeric product prepared in accordance with the method of claim 1.

* * * * *